Figure 6:
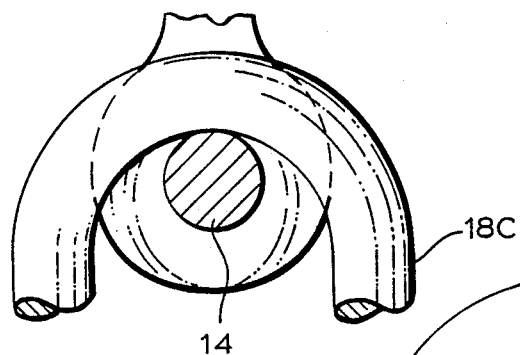

United States Patent [19]

Bernt et al.

[11] Patent Number: 4,914,903
[45] Date of Patent: Apr. 10, 1990

[54] LINK SHACKLE

[75] Inventors: Jorgen O. Bernt, Oakville; Barry C. Forster, Mississauga, both of Canada

[73] Assignee: J. O. Bernt & Associates Limited, Burlington, Canada

[21] Appl. No.: 344,660

[22] Filed: Apr. 26, 1989

[51] Int. Cl.⁴ .............................................. F16G 15/06
[52] U.S. Cl. ............................................ 59/86; 59/78; 474/218
[58] Field of Search ...................... 474/218; 59/78, 85, 59/86, 93; 152/241, 242, 243

[56] References Cited

U.S. PATENT DOCUMENTS

| 2,259,880 | 10/1941 | Ehmann | 59/86 |
| 2,709,616 | 5/1955 | Larson et al. | 59/86 |
| 2,729,058 | 1/1956 | Dock | 59/86 |
| 3,559,713 | 2/1971 | Mueller et al. | 59/85 |
| 3,958,411 | 5/1976 | Bernt | 59/86 |
| 4,050,496 | 9/1977 | Weidler | 59/86 |

FOREIGN PATENT DOCUMENTS 2080478 2/1982 United Kingdom ............... 59/86

*Primary Examiner*—David Jones

[57] ABSTRACT

A shackle of cast metal defines a threaded bore for a cast pin. The shackle is specially shaped to define a circular locus for a joined link whether said link contacts shackle body, ear or pin.

8 Claims, 3 Drawing Sheets

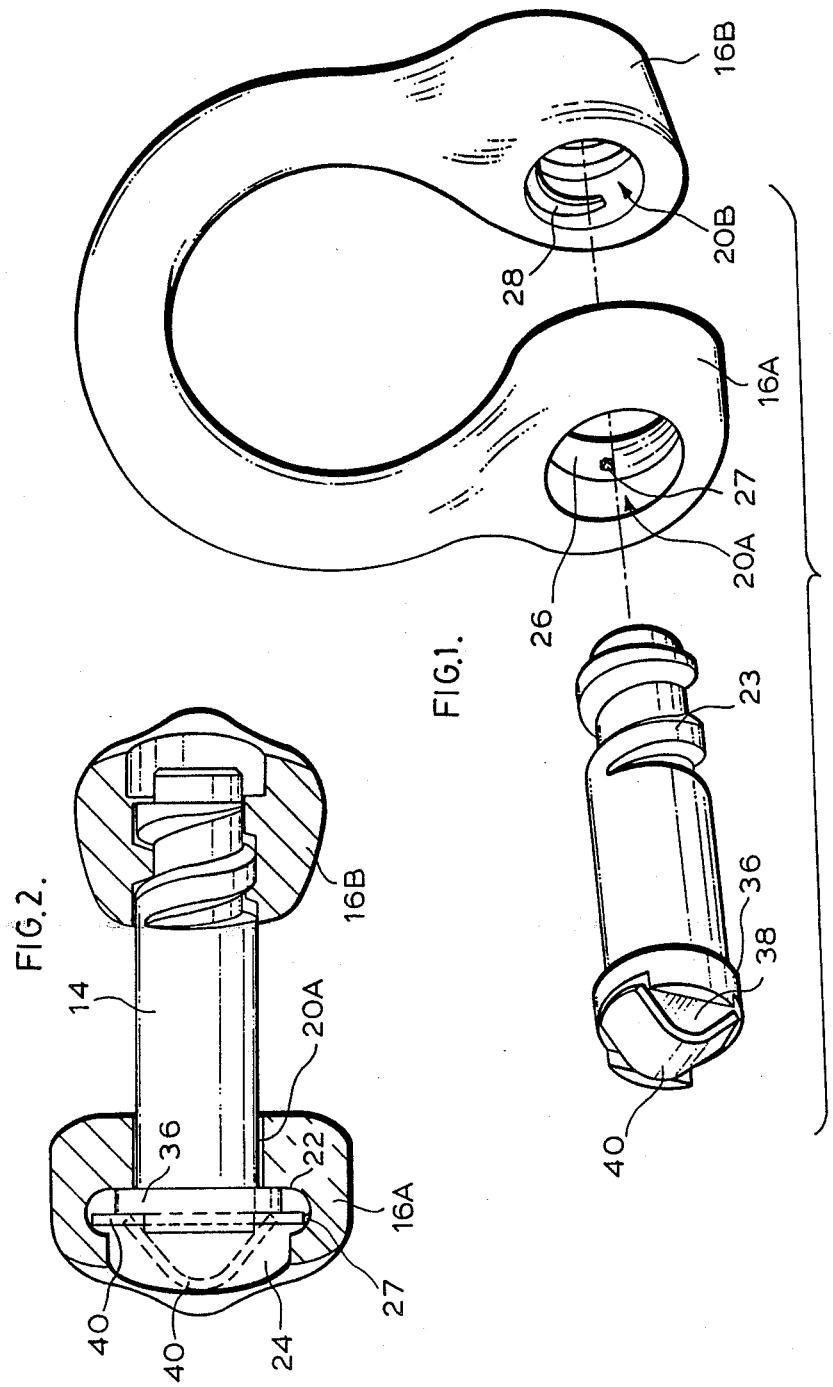

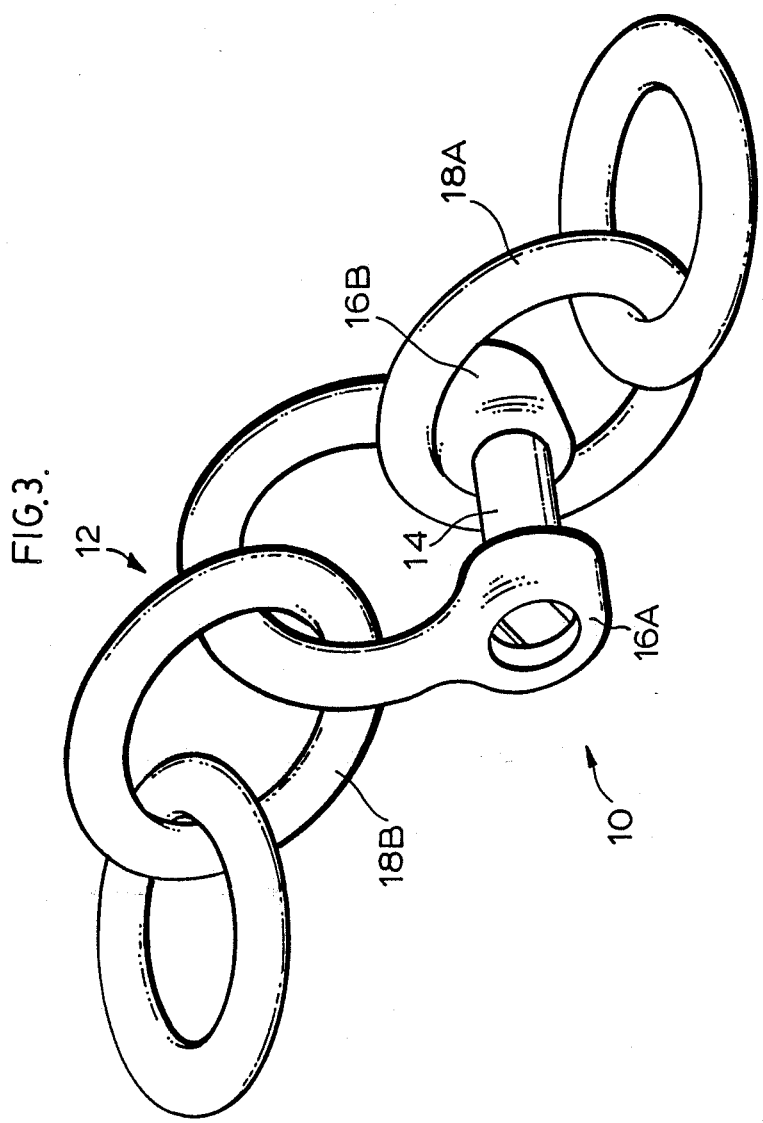

LINK SHACKLE

This invention relates to a link-shackle adapted for use as a shackle to attach a chain to a fixed mount and having more common use as a junction link for joining two lengths of chain together.

When a shackle or junction link is used for joining the links of two lengths of chain together it is important to ensure that the wear on all parts of the shackle is substantially equal. The shackle is therefore constructed so that its innermost edge is substantially circular so that the linked chain link on each side has an equal tendency to ride on any portion of the shackle body. However problems are encountered at the pin extending between the ears of the shackle. If the innermost surface of the pin is outside the circular locus of the innermost surface of the shackle body, at some times the joined links will wish to ride only on the pin causing wear on the pin and wear by the other joined link at the diametrically opposed location. If the innermost surface of the pin is inside the circular locus the joined links will assume other diametrically opposed positions in the circumference excluding the pin and its diametrically opposed location and cause excessive wear at such other locations.

In accord with the invention it is desirable to locate the pin so that its innermost surface is a tangent to the circle defined by the innermost surface of the body of the shackle.

However with such arrangement the locations where the pin meets the shackle ears form niches where a joined link may rest farther from the centre of the innermost circle than it does when in other locations. Thus each niche and its diametrically opposed location form unusual wear points.

In a preferred embodiment of the invention a link-shackle is provided where the main body of the shackle is of circular cross section and extends about the locus of a circle. Given the circular locus the innermost portions of the shackle on this locus define what is called the innermost circle while the plane containing the innermost circle is called the median plane. The body of the shackle is thickened in the vicinity of the location where the pin emerges from the ears so that a joined link (whose median plane is perpendicular to that of the shackle) cannot contact the pin in the vicinity of its emergence from the ears but rather rides on the thickened portion at a location relative to the center of the 'innermost circle' that is the same distance from the centre of the innermost circle as when the link is contacting the circular section of the shackle body. The thickened areas are preferably arranged so that the pin is contacted only at its tangent point to such circle. The joined links then have an equal tendency to contact all portions of the circumference of the shackle, including the pin vicinity and localized wear of the shackle is avoided.

In another aspect of the invention the pin is threaded at one end into a bore in one shackle ear and means are provided to prevent axial withdrawal of the pin associated with the bore in the other ear. The double lock feature provided which prevents both axial and 'unscrewing' withdrawal is thought to be unique and to provide security for the shackle under tension and flexure stresses in the chain.

The expense of cutting a screw thread in the bolt and the shackle body is avoided in a preferred embodiment of the invention by casting the parts. This can be suitable for the shackle in question by providing coarse threads requiring only about 1–2 turns between the fully attached and detached positions of the pin and shackle.

Figure 5:
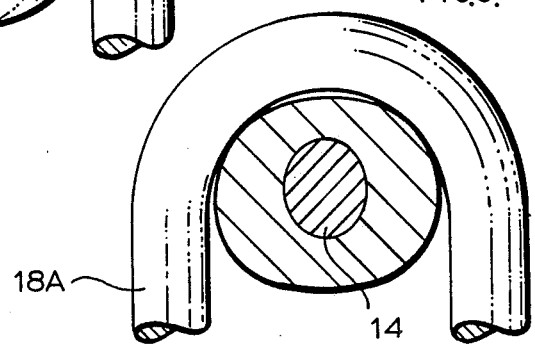
Figure 4:
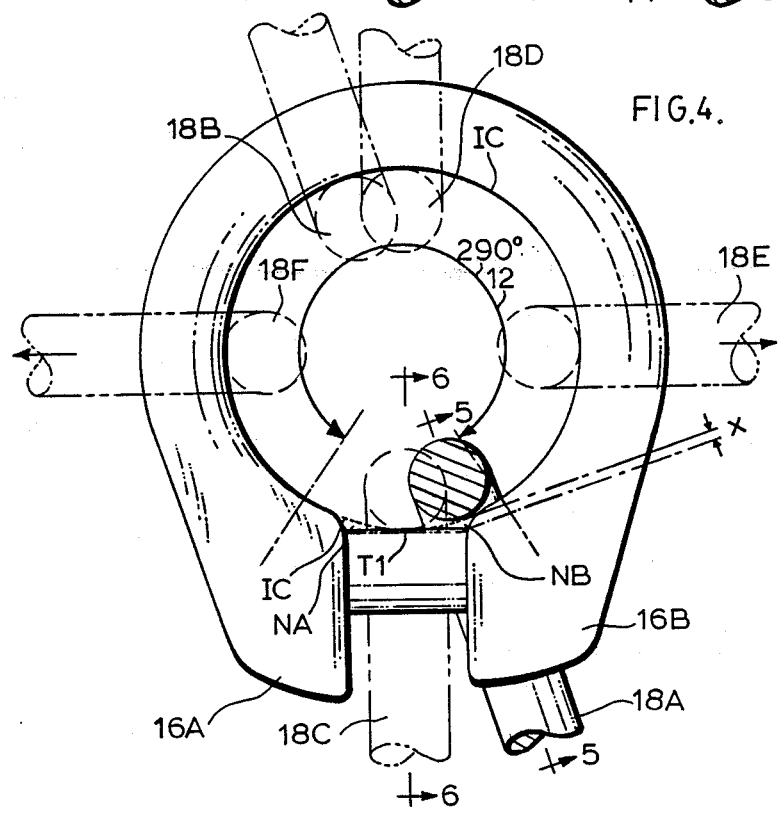

It has also been found that in some applications where the shackle is used the stresses tending to rotate the bolt are consistently stronger in one direction than the other. Thus the shackle can be arranged in an orientation where the pin screw tends to tighten instead of loosen. For example, in a rotary kiln where the shackle is used to attach hanging chains to the kiln wall, the shackle (assuming a normal or right hand thread) should be arranged with the head end of the pin facing the installer when looking in the direction of clockwise kiln rotation. Then the pin will tighten and the only need of the axial withdrawal prevention means is for shackles mistakenly installed the wrong way round. Thus it is possible for many applications to cast the pin and shackle with a loose thread tolerance even through the installation only requires 1–2 turns. This contributes to the strength and convenience of the cast construction. The use of a cast construction contributes to the cheapness and strength of the shackle and pin. In drawings which illustrate a preferred embodiment of the invention:

FIG. 1 is a perspective view of a shackle and its pin in exploded arrangement,

FIG. 2 is a section of shackle and pin in assembled position taken along the axis of the pin and perpendicular to the median plane of the shackle, FIG. 3 is a perspective of a shackle joining two chain links, FIG. 4 is a side view of a shackle showing three diametrically opposed positions for joined links FIG. 5 is a section along the lines 5—5 of FIG. 4, and, FIG. 6 is a section along the lines 6—6 of FIG. 4

In the drawings it will be seen that for about 290° of the shackle 10 circumference the shackle body has an extent 12 with a uniform circular section (See FIG. 4). This extent 12 defines a median plane of the shackle, parallel to the plane of the paper in FIG. 4 and vertical and perpendicular to the plane of the paper in FIGS. 5 and 6.

The circular line of the innermost portion of the uniform shackle section (see FIG. 4) is called the innermost circle IC herein and such innermost circle is considered as extending about the area of the shackle ears and the pin 14 so that it is tangent at T1 to the centre of the exposed pin 14 extent between the ears.

It will be seen that when the shackle 10 is joining two chain links 18 of chains in tension the joined links will naturally try to assume diametrically opposed positions on the innermost circle. One position of such diametrically opposed links is 18A, 18B (FIGS. 3, 4, and 5) while another position (FIGS. 4, 6) is 18C, 18D. The invention is, in one facet, directed to providing that these diametrically opposed links have an equal tendency to ride and wear at all diametric positions on the shackle 10 including positions which involve the exposed portion of pin 14 between the shackle ears.

The uniform body extent of the shackle is provided with thickened ears 16A, 16B spaced by a gap to admit the thickness of the chain link 18 or links being joined. Usually such links will be or circular section (as indicated in FIG. 4) of the same diameter or smaller as that of the uniform portion of the shackle body.

The ears 16A, 16B are provided with aligned bores 20A, 20B to receive the pin. Remote from the insertion side the bore 20B is cast with a spiral, preferably right hand thread 28 allowing between 1 and 2 and preferably 1½ turns of the complementarily cast screw 23 to be inserted therein.

The insertion side of the shackle has bore 20A of cylindrical form conforming to the roots of the threaded grooves of bore 20B approximately midway through bore 20A the bore is widened to form outwardly facing shoulders 22 and the widened bore extent 24 is provided with a peripheral groove 26 just to the insertion side of shoulder 22.

The pin 14 is of circular section preferably of the diameter of extent 12 provided with complementary threads 23 to screw, with a loose tolerance, in the shackle threading 28 and it will be noted that the main smooth exterior of pin 14 has the same diameter crests of the threads 23. The bore 20A is designed to slidably receive the smooth portion of pin 14. Pin 14 is provided with a widened head 36 whose inner surface is shaped to rest on shoulder 22 which forms a stop when the pin is screwed into place. The outer surface of head 36 is provided with a wide diametrical groove 38 in which is located the bent strip 40. With the pin screwed against shoulder 22 the strip 40 may be flattened by a hammer blow to rest in groove 26 and form a stop against axial outward movement (by unscrewing) of pin 14. Preferably the root of groove 26 is provided with radially inward projecting abutments 27 designed and located so that one or more could contact the strip 40 in its flattened attitude and resist its rotation. This effectively resists the rotation of the pin also, and acts as a rotary stop to unscrewing of the pin.

The flattened strip 40 riding in the groove 26 is not new. It is however thought to be new to combine a threaded pin with separate means such as the strip for preventing rotation or axial withdrawal of the pin. It is also thought new to form a shackle and threaded bolt of cast construction.

The ears 16A, 16B are thickened and shaped in such a way that the section of a link 18 contacting the widened ear portions of the shackle is at the same distance from the centre of innermost circle IC as when the link is riding on the uniform extent 12.

Thus the links 18 must be prevented from contacting points on the pin 14 other than the centre of the exposed pin extent which is located to be tangent to the innermost circle IC and in particular must be prevented from contacting the niches NA, NB where the exposed pin joins the shackle body, since otherwise the link would tend to ride in such niche and the other joined link would be diametrically opposed tending to provide undue wear conditions at the contact locations preventing rotation and the even wearing of the shackle.

Thus the regions of the shackle adjacent niches NA, NB are thickened so that a joining link 18 cannot contact the pin except at its mid point corresponding to tangency point Tl and in fact the link 18 (whose median plane in chain tension will be perpendicular to that of the shackle) is caused by the ear shaping to follow the path such that the link 18 at all locations adjacent niche NA or NB follows a path where the link 18 is tangent to the innermost circle. This creates the spacing X from the niches giving opposed links an equal tendency to assume diametrically opposed locations through 360° of the circumference of the inventive shackle, providing equal wear. Thus diametrically opposed links at locations 18E, 18F both contacting the uniform extent 12 of the shackle are tangent to the innermost circle IC, as are links at locations 18A, 18B where links at position 18A are opposite the niche NA contact the thickened ear 16B and at the diametrically opposed position 18B; and as are links at position 18C contacting point Tl on pin 14 and the diametrically opposed position 18D.

It is noted that the pin 14 is preferably cast to have loose tolerance in the shackle. For the pin innermost surface to approach (as near as reasonable practice can achieve) tangency to the innermost circle IC at its mid exposed point the pin location and dimensions are designed so that when stressed outwardly (removing the outward and doubling the inward clearance) by tensioned chains, the innermost surface of the pin will be tangent to the innermost circle IC.

I claim:
1. Shackle comprising,
   elongate case metal body defining a generally circular outline and substantially circular cross-section and defining a gap in said circular outline for the admission of a link or shackle of similar section,
   each end of the body, adjacent each side of the gap, defining ears which, in turn, define aligned bores for the reception of a pin extending across said gap,
   one of said bores being shaped by the casting to define a spiral thread, and the other of said bores being unthreaded,
   a pin of cast metal shaped and dimensioned to be inserted through the other said bore and into said one bore and having at one end a cast spiral thread complementary to that in said bore and adapted to make a loose fit therewith;
   wherein the end of said pin remote from the thread is located at a location within the other of said bores, a groove surrounds said unthreaded bore just outwardly of said location whereby a diametrically extending strip having opposite ends may have its ends inserted in said bores outward of the so located end to retain said pin in said bore.

2. Shackle as claimed in claim 1 wherein said groove has a root and the root of said groove is interrupted by abutments adapted to inhibit rotation of said strip in said groove.

3. Shackle comprising,
   elongate metal body of substantially circular cross-section, said body defining a generally circular outline and defining a median plane and defining a gap for the admission of a link or shackle of similar section,
   the body, adjacent each side of the gap defining ears which in turn define aligned bores for the insertion of a pin extending across said gap
   a pin of metal shaped and dimensioned to be inserted in said bores
   means for maintaining said pin in said bores wherein said body is shaped to define an innermost circle on its innermost surface as viewed perpendicular to said median plane
   said pin and bores being adapted to locate the innermost surface of said pin when inserted in said bores substantially at a tangent to said innermost circle 4. Shackle as claimed in claim 3 including thickened areas on said body arranged to maintain a coupled link of similar section, when with the coupled link's median plane is radial relative to the centre of said circle, at the same radius from the centre of the circle as when contacting the circular cross-section portions of said body.

5. Shackle as claimed in claim 3 wherein said body and pin are of cast metal, said pin is cast with a spiral thread and one of said bores is provided with a complementary thread designed to receive said pin thread with a loose tolerance.

6. Shackle as claimed in claim 4 wherein said body and pin are of cast metal, said pin is cast with a spiral thread and one of said bores is provided with a complementary thread designed to receive said pin thread with a loose tolerance.

7. Shackle as claimed in claim 5 including means associated with the other bore for preventing withdrawal by unscrewing of said pin.

8. Shackle as claimed in claim 6 including means associated with the other bore for preventing withdrawal by unscrewing of said pin.

* * * * *